US012226006B2

(12) United States Patent
Dalton et al.

(10) Patent No.: US 12,226,006 B2
(45) Date of Patent: Feb. 18, 2025

(54) TOOL SHEATH

(71) Applicant: AOB Products Company, Columbia, MO (US)

(72) Inventors: Mark Dalton, Columbia, MO (US); Dennis W. Cauley, Jr., Fayette, MO (US); Timothy S. Kinney, Warrenton, MO (US); James Tayon, Moberly, MO (US)

(73) Assignee: AOB Products Company, Columbia, MO (US)

( * ) Notice: Subject to any disclaimer, the term of this patent is extended or adjusted under 35 U.S.C. 154(b) by 110 days.

(21) Appl. No.: 17/983,215

(22) Filed: Nov. 8, 2022

(65) Prior Publication Data

US 2023/0146616 A1 May 11, 2023

Related U.S. Application Data

(60) Provisional application No. 63/263,734, filed on Nov. 8, 2021.

(51) Int. Cl.
*A45F 5/02* (2006.01)
*B25B 7/02* (2006.01)

(52) U.S. Cl.
CPC ...... *A45F 5/021* (2013.01); *A45F 2200/0575* (2013.01); *B25B 7/02* (2013.01)

(58) Field of Classification Search
CPC ..... A45F 2200/0575; A45F 5/021; B25B 7/02
USPC ........................... 224/242, 245, 904; D3/228
See application file for complete search history.

(56) References Cited

U.S. PATENT DOCUMENTS

| | | | | | |
|---|---|---|---|---|---|
| 2,783,536 | A * | 3/1957 | McQueary | B26B 29/025 | 224/675 |
| 3,246,813 | A * | 4/1966 | Miller | B26B 29/025 | 30/162 |
| 3,516,585 | A * | 6/1970 | Inwood | B25H 3/006 | 206/349 |
| 4,496,088 | A * | 1/1985 | Tuthill | A45F 5/02 | 224/232 |
| 5,146,684 | A * | 9/1992 | Hagler | B26B 29/025 | 30/162 |
| 5,388,740 | A * | 2/1995 | Garland | B26B 29/025 | 224/675 |
| 5,511,703 | A * | 4/1996 | Ryerson | B25H 3/00 | 224/684 |
| D417,073 | S * | 11/1999 | Diener | D3/228 | |
| 6,085,952 | A * | 7/2000 | Garland | B26B 29/025 | 224/907 |
| D451,276 | S * | 12/2001 | Nigh | D3/228 | |
| 6,837,373 | B2 * | 1/2005 | Huang | B25H 3/006 | 206/480 |
| 6,874,630 | B2 * | 4/2005 | Lin Wu | A47F 7/024 | 206/349 |
| D506,311 | S * | 6/2005 | Nigh | D3/228 | |

(Continued)

OTHER PUBLICATIONS

Four Images of Pliers and Knives, 4 pages, at least as early as May 3, 2021, admitted prior art.

*Primary Examiner* — Justin M Larson
(74) *Attorney, Agent, or Firm* — Stinson LLP

(57) ABSTRACT

A tool sheath and associated components and methods. The sheath can be configured to receive a pliers. The sheath can include one or more pliers retainers configured to engage the pliers to retain the pliers in a pliers receiving space of the pliers.

19 Claims, 13 Drawing Sheets

(56) References Cited

U.S. PATENT DOCUMENTS

| | | | | | |
|---|---|---|---|---|---|
| D583,549 | S * | 12/2008 | Schuyler | D3/228 | |
| 8,109,420 | B2 * | 2/2012 | Martinez | A45F 5/02 | 224/268 |
| 9,504,310 | B2 * | 11/2016 | Foreman | B65H 49/205 | |
| D793,195 | S | 8/2017 | Grass | | |
| 2004/0173486 | A1 * | 9/2004 | Lin Wu | A47F 7/024 | 206/349 |
| 2004/0217029 | A1 * | 11/2004 | Ho | B25H 3/00 | 206/349 |
| 2015/0245700 | A1 * | 9/2015 | Merzon | A45F 5/021 | 224/245 |
| 2017/0197803 | A1 * | 7/2017 | Foreman | A45F 5/021 | |
| 2018/0368561 | A1 * | 12/2018 | Bond | B26B 29/04 | |

* cited by examiner

TOOL SHEATH

CROSS-REFERENCE TO RELATED APPLICATION

The present application claims priority to U.S. Provisional Patent App. No. 63/263,734 Nov. 8, 2021, which is hereby incorporated by reference in its entirety.

FIELD

The present disclosure generally relates to a sheath for stowing a tool, and more particularly to a sheath for stowing a pair of pliers.

BACKGROUND

Some tool sheaths allow a tool to move around when stowed. Improvements are needed.

SUMMARY

In one aspect, a pliers sheath for holding a pliers has a head and at least two handles connected to the head at a joint. The pliers sheath comprises a mounting portion for mounting the sheath onto a support structure. The pliers sheath includes a pliers holder comprising flexible material. The pliers holder includes a holder body defining a receiving space for receiving the head of the pliers. The pliers holder includes a keeper arranged to engage the pliers to retain the pliers in the sheath. The flexible material is configured to permit the keeper to resiliently deflect away from an at rest position in response to insertion of the head of the pliers into the receiving space. The flexible material is configured to resiliently return the keeper toward the at rest position.

Other objects and features of the present disclosure will be in part apparent and in part pointed out herein.

BRIEF DESCRIPTION OF THE DRAWINGS

Corresponding reference numbers indicate corresponding parts throughout the drawings.

DETAILED DESCRIPTION

Figure 1:
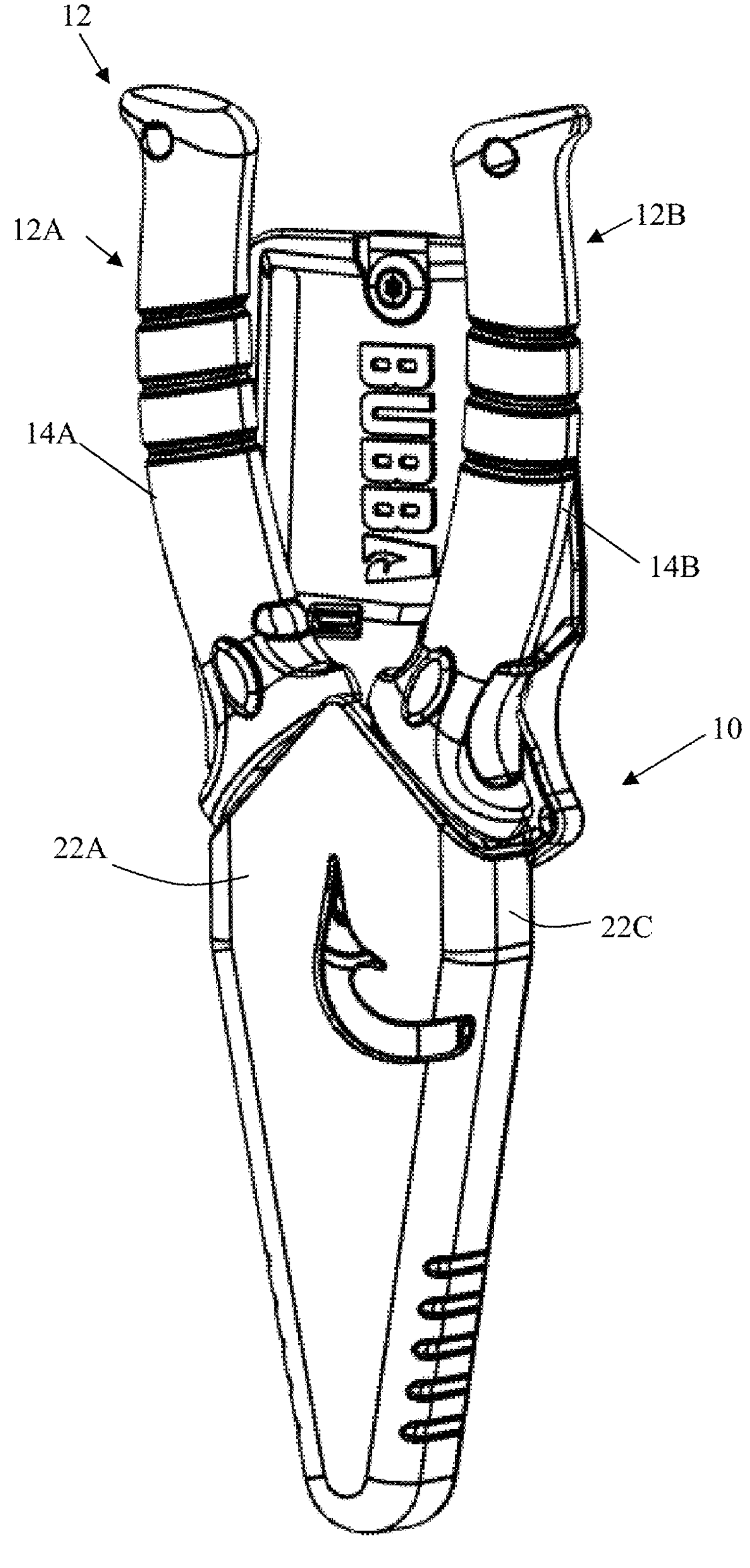
FIG. 1 is a front perspective of a pliers held by a pliers sheath.

Referring to FIG. 1, a sheath 10 of the present disclosure is usable for stowing a pair of pliers 12 (broadly, "multihandle tool having jaws"). In the illustrated embodiment, the tool is a "needle-nose" type pliers configured to assist a fisherperson/user in removing a hook from a mouth of a fish. It will be appreciated the sheath 10 could be used for stowing a pair of scissors or other two-handled tool having jaws without departing from the scope of the present disclosure. Moreover, aspects of the sheath could be used in other types of sheaths (e.g. knives, etc.) without departing from the scope of the present disclosure.

Figure 3:
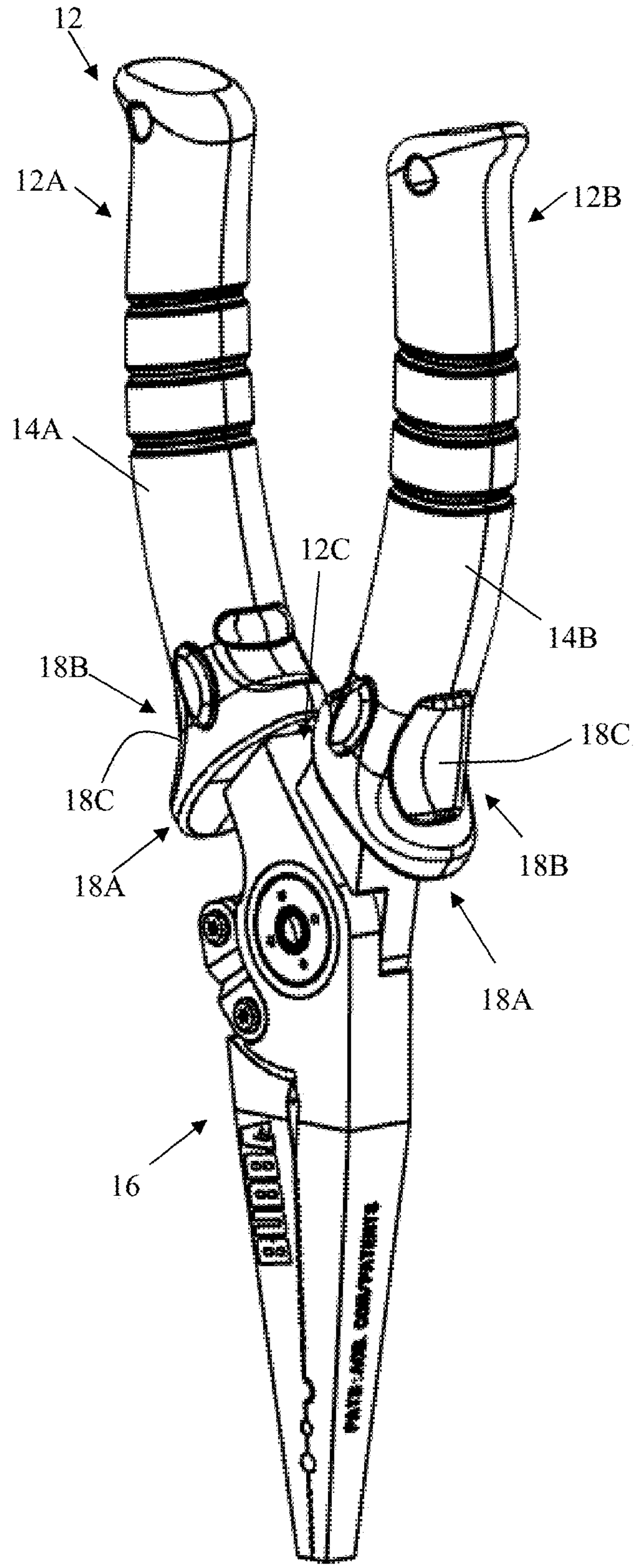
FIG. 3 is a perspective of the pliers usable with the pliers sheath.

Illustrated in FIG. 3, the pliers 12 includes two pliers arms 12A, 12B pivotably joined at a pivot point, referred to herein as a joint 12C. Each of the pliers arms 12A, 12B includes a handle portion 14A, 14B and a jaws portion 16. The handle portions 14A, 14B may be provided with a gripping portion to assist the user in grasping the pliers 12. The handle portions 14A, 14B are configured to receive fingers and a thumb/palm of a user's hand, allowing the user to move the arms between an open (not shown) and closed position to actuate the jaw portions. In the illustrated embodiment, each handle portion includes a head having a pusher member 18A and a recess 18B, (together broadly considered "sheath engagement structure"). Each recess 18B is defined by a finger/thumb bed 18C configured to receive a finger and/or thumb of the user while the user grasps the pliers. In the illustrated embodiment, the handle portions 14A, 14B are overmolded with a polymeric material (e.g. Kraton material) gripping portion configured to assist the user in gripping the pliers. The gripping portions can provide friction to the user grasping the pliers and when the pliers is stowed in the sheath, as will be described in greater detail below. In the illustrated embodiment, the Kraton material of each handle portion provides the head and recess of each handle portion.

Figure 4:
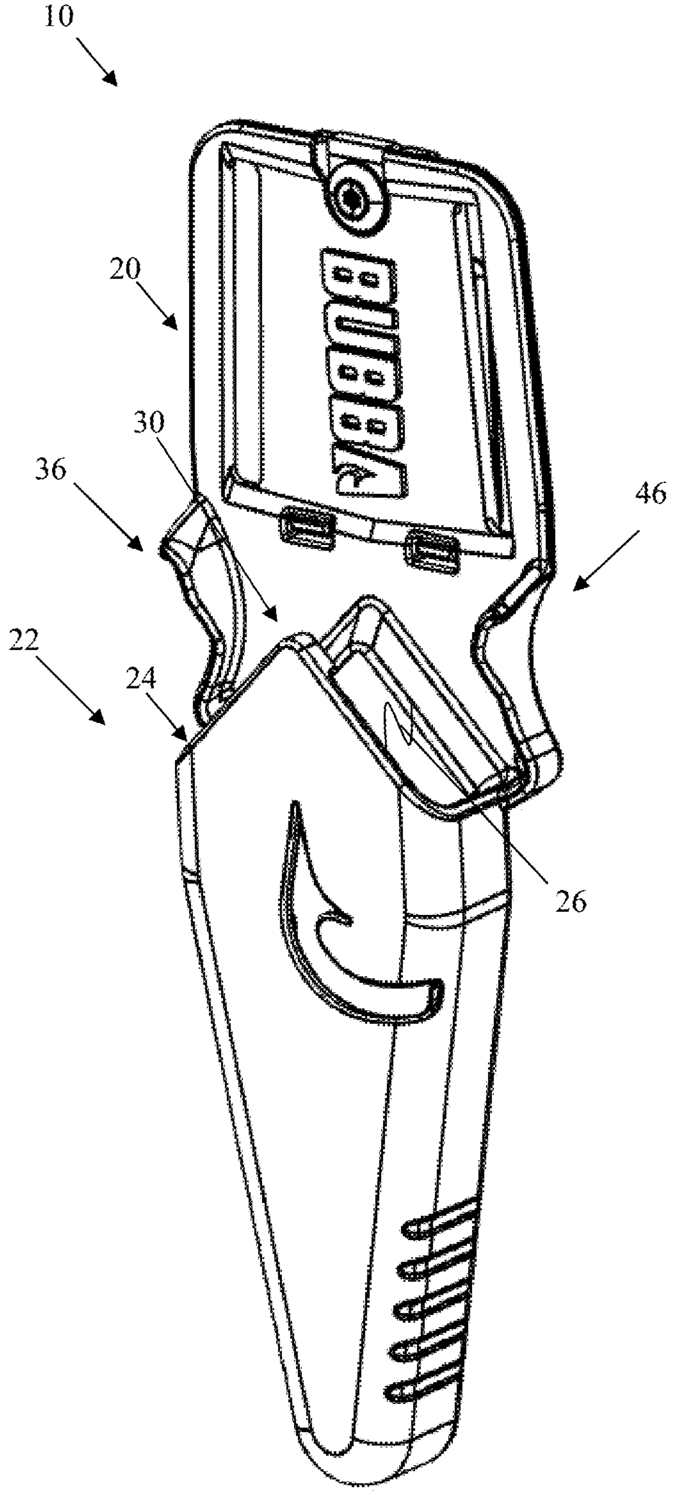
FIG. 4 is a front perspective of the pliers sheath.

Referring to FIG. 4, the sheath 10 includes a body forming a mount 20 and a holder 22. The body is formed of a resiliently deformable material. In the illustrated embodiment, the resiliently deformable material is a polymeric material (e.g. injection molded plastic).

Figure 2:
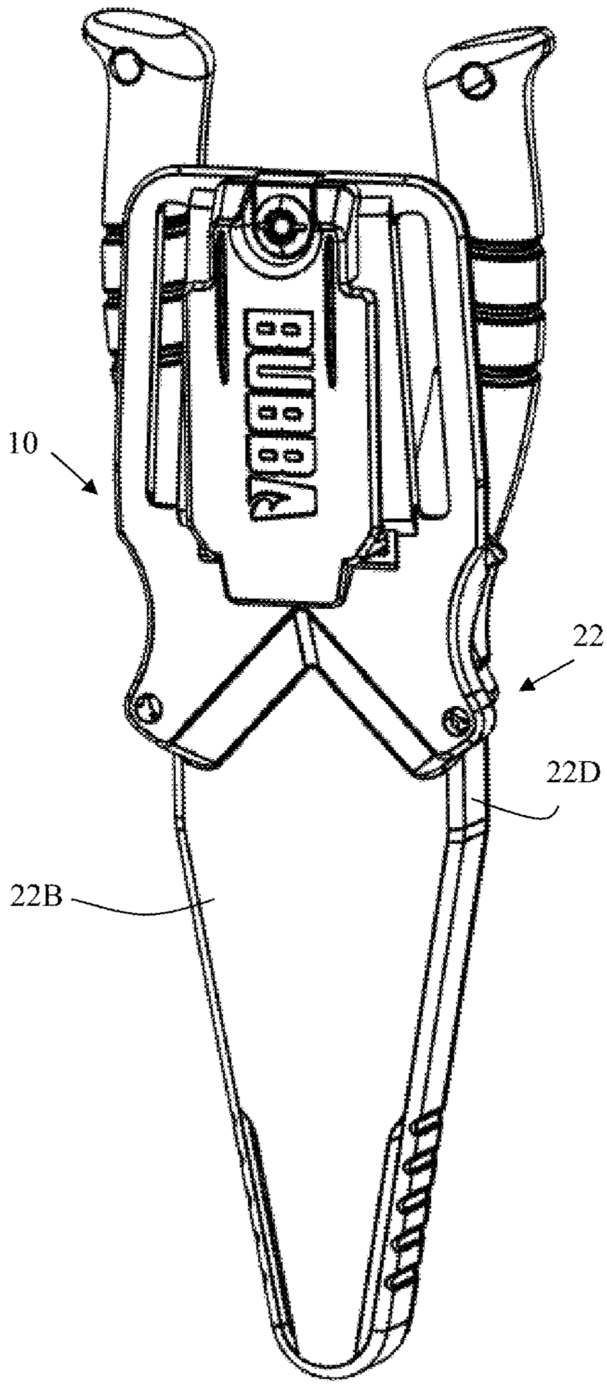
FIG. 2 is a rear perspective of FIG. 1.

Referring to FIGS. 1, 2, and 4, the holder 22 defines a receiver 24 having a tool-receiving recess 26 (broadly, "recess") in which the jaws 16 of the pliers 12 are receivable for stowing the pliers 12 in the sheath 10. The holder 22 includes a front (first) panel 22A and a rear (second) panel 22B bounding the recess 26. Left (third) and right (fourth) panels 22C, 22D respectively, extend between the front and rear panels. The recess 26 includes a lower portion configured to receive the jaws 16 of the pliers 12. The lower portion tapers and has a narrower width than an upper portion of the recess. The upper portion is configured to receive segments of the handle portions of the pliers, as will be described in greater detail below.

Figure 5:
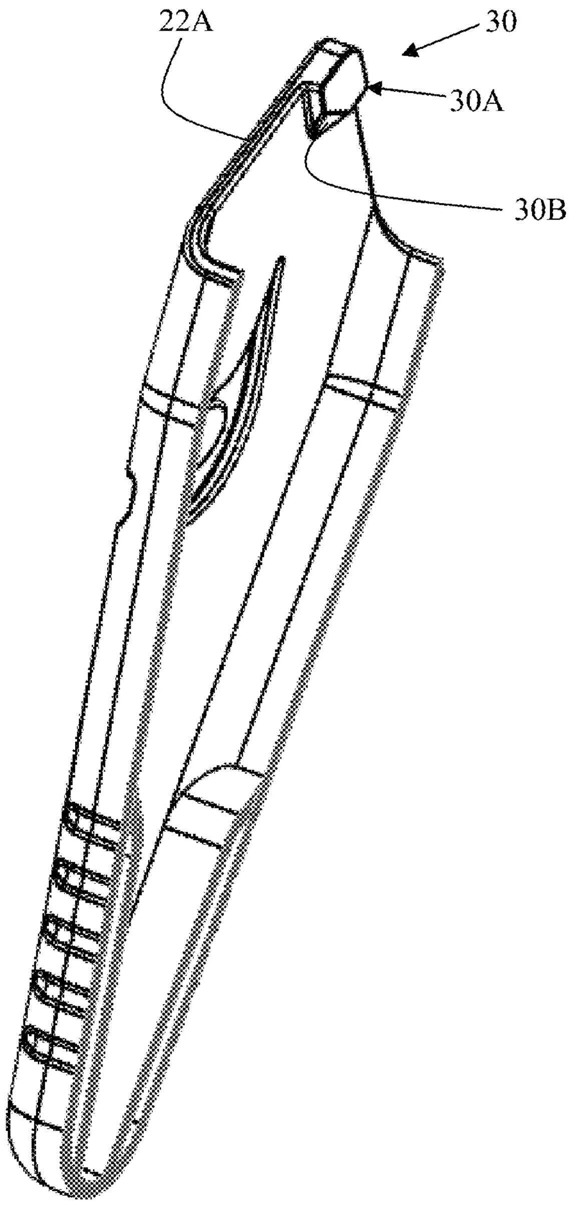
FIG. 5 is a rear perspective of a cross section of FIG. 4.

The holder 22 includes at least one keeper (broadly, "pliers engagement structure") configured to releasably retain the pliers 12 in the holder 22. In the illustrated embodiment, there are three keepers. Referring to FIGS. 4 and 5, a first keeper 30 comprises a detent 30A (broadly, "protrusion") extending rearward toward the rear panel 22B from an upper end portion of the front panel 22A. The detent 30A includes a camming surface 30B angled generally toward the bottom of the recess. The first keeper 30 is configured such that a dimension of the recess 18B between a distal end of the keeper 30 and a forward facing surface of the rear panel 22B is less than the thickness of the joint. Other configurations can be used without departing from the scope of the present disclosure.

Figure 6:
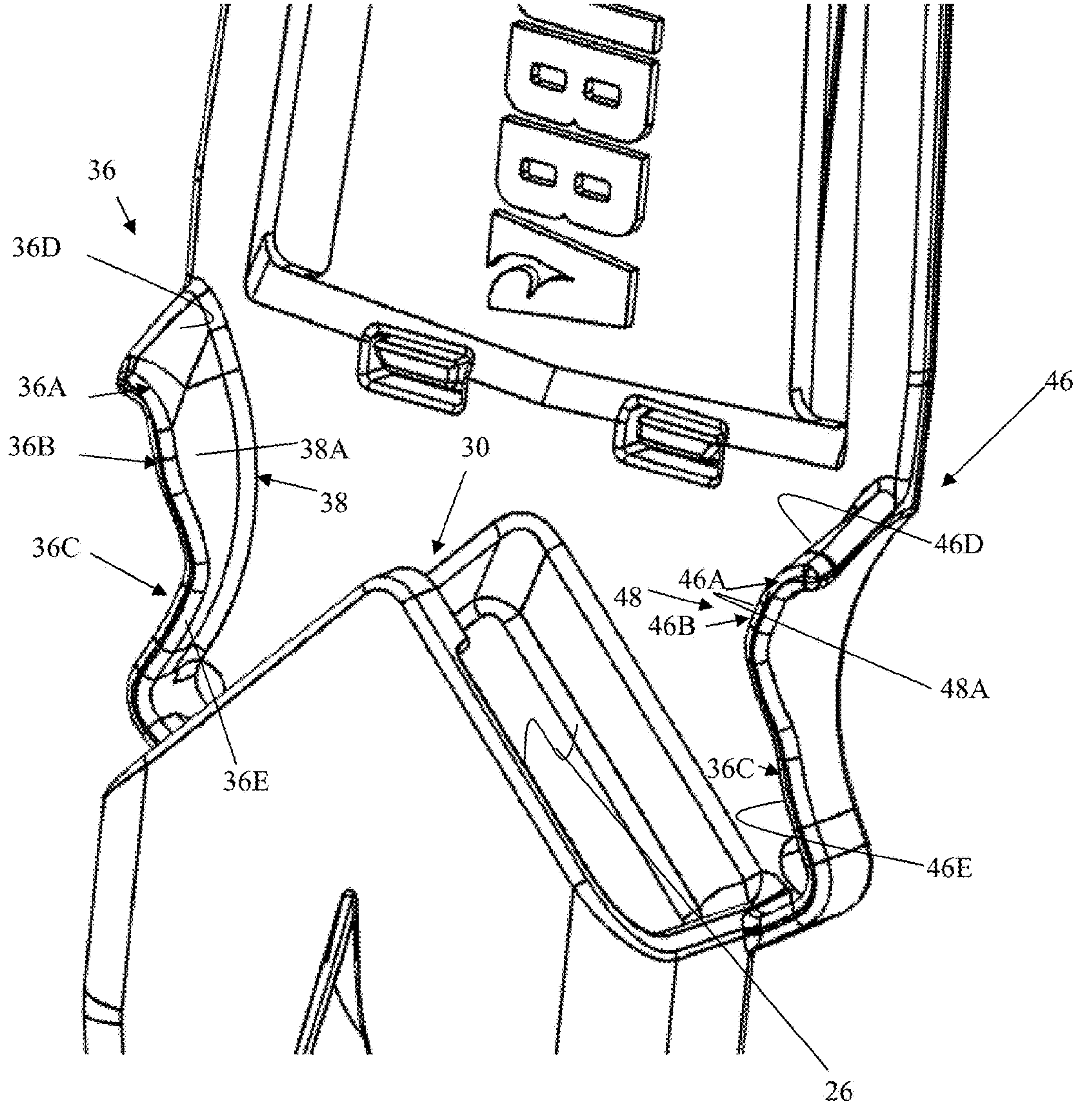
FIG. 6 is an enlarged fragmentary perspective of pliers engagement structure.

Referring to FIG. 6, the holder 22 includes a second keeper 36 and a third keeper 46 (broadly, "pliers engagement structure") configured to releasably retain the pliers 12 in the holder 22. The second and third keepers 36, 46 are provided at upper end portions of the left and right panels 22C, 22D and protrude inward toward the recess 26 to obstruct removal of the pliers 12 from the holder 22. The first and second keepers 36, 46 are arranged to engage the handle engagement structure of respective handle portions of the pliers to obstruct removal of the pliers.

The second keeper 36 will be described in greater detail with the understanding that the third keeper 46 includes identical mirroring features with like reference numbers plus 10. The second keeper 36 includes a proximal portion, a distal portion, and a keeper body extending therebetween. The proximal portion is connected (e.g. integrally formed) to the sheath body. The second keeper 36 comprises a first ramp portion 36A, a wing portion 36B, and a second ramp portion 36C. The first ramp portion 36A includes a first tapered surface 36D facing generally away from the recess 26. The wing portion 36B includes a thumb 38 having a camming surface 38A facing in a generally transverse direction with respect to the recess 26. The second ramp portion 36C includes a second tapered surface 36E facing generally toward the receiver 26. The tapered surfaces 36D, 36E of the first and second ramp portions 36A, 36C and the camming surface 38A of the thumb 38 are integrally formed and can all generally be referred to as handle portion engagement structure.

The dimension between the first tapered surfaces 36D, 46D of the respective first ramp portions 36A, 46A of the first and second keepers 36, 46 is slightly wider than the dimension between the camming surfaces 38A, 48A of the respective thumbs 38, 48 of the first and second keepers 36, 46. The dimension between the second tapered surfaces 36E, 46E of the respective second ramp portions 36C, 46C of the second and third keepers 36, 46 is slightly wider than that of the first tapered surfaces 36D, 46D to form gaps in that region when the pliers is stowed in the sheath. The first and second keepers may be omitted without departing from the scope of this disclosure.

Figure 9:
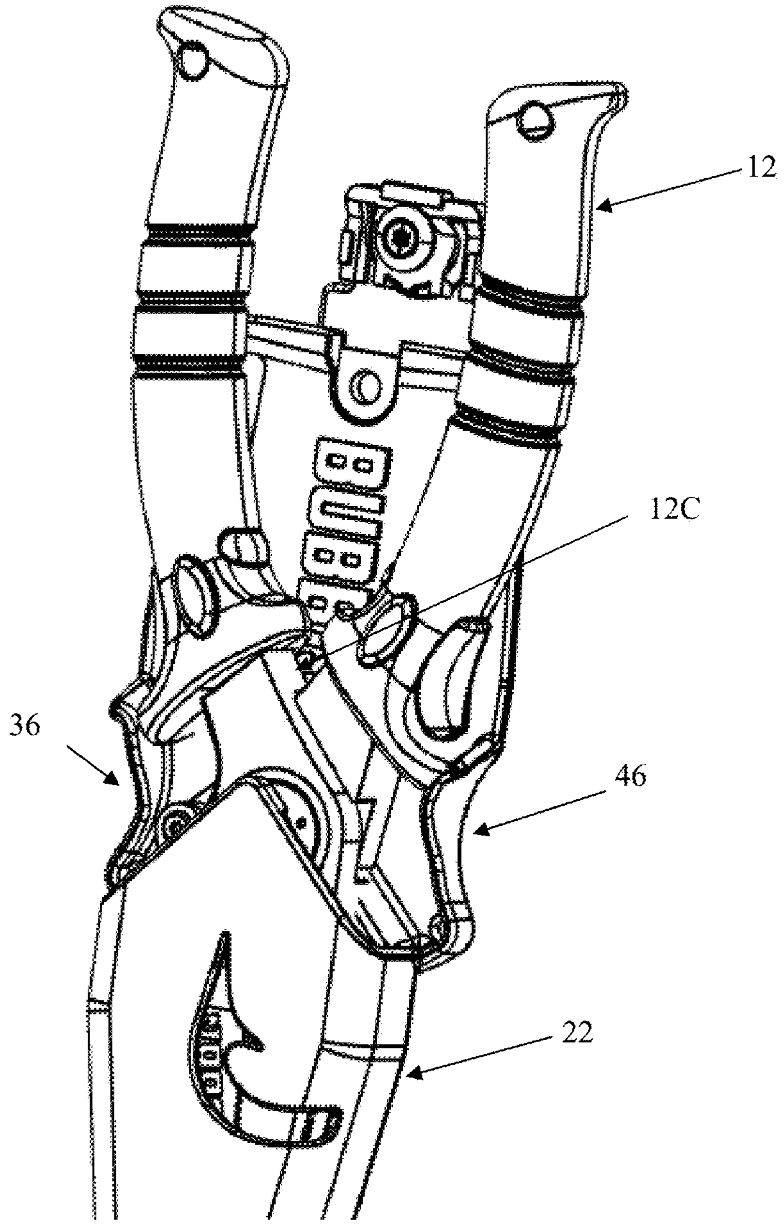
FIG. 9 is a fragmentary perspective of a first stage of the pliers entering the sheath.

A cycle of use of inserting and removing the pliers 12 to and from the sheath 10 will now be discussed with respect to FIGS. 1, 7, 9, and 10. Referring to FIG. 9, in a first stage, the user inserts the pliers 12 into the sheath 10 so the heads of the respective handle portions engage the respective second and third keepers 36,46. The user provides a sufficient pushing force to allow pusher members 18A of the respective handle portions 14A, 14B engage respective first tapered surfaces 36D, 46D, causing the respective second and third keepers 36, 46 to resiliently deflect laterally outward to a Position 1. In Position 1, the joint 12C of the pliers 12 is located above the first keeper 30. A highest compression force is resulted on the handles at Position 1, caused by the resilient deformity of the second and third keepers 36,46 pushing back on the heads of the handle portions.

Figure 7:
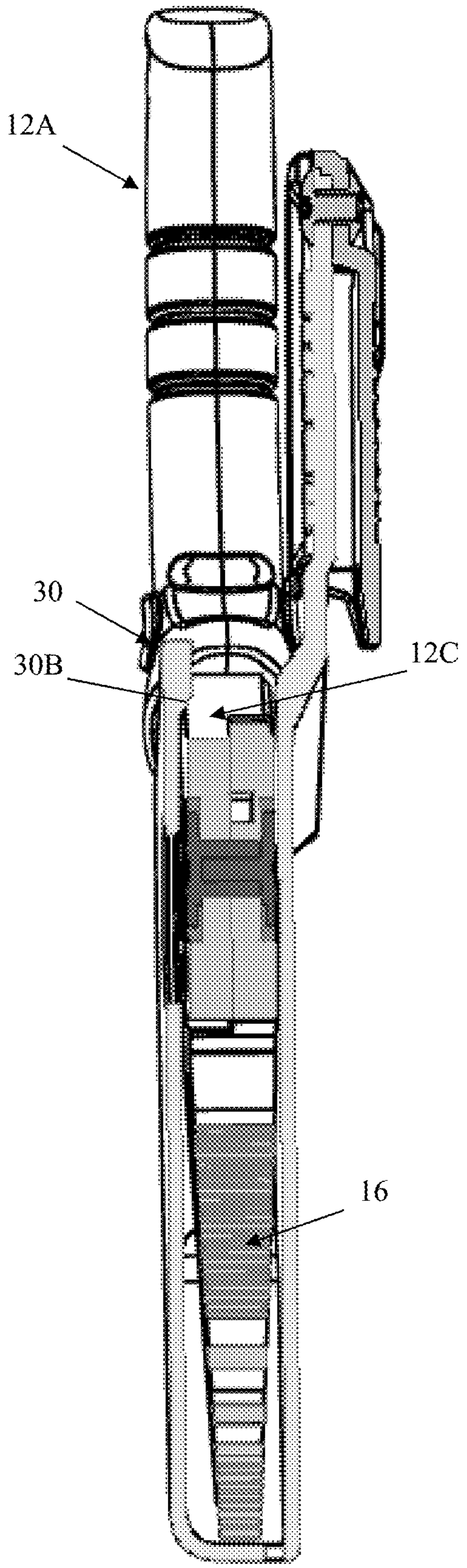
FIG. 7 is a cross section of the pliers stowed in the pliers sheath.
Figure 8:
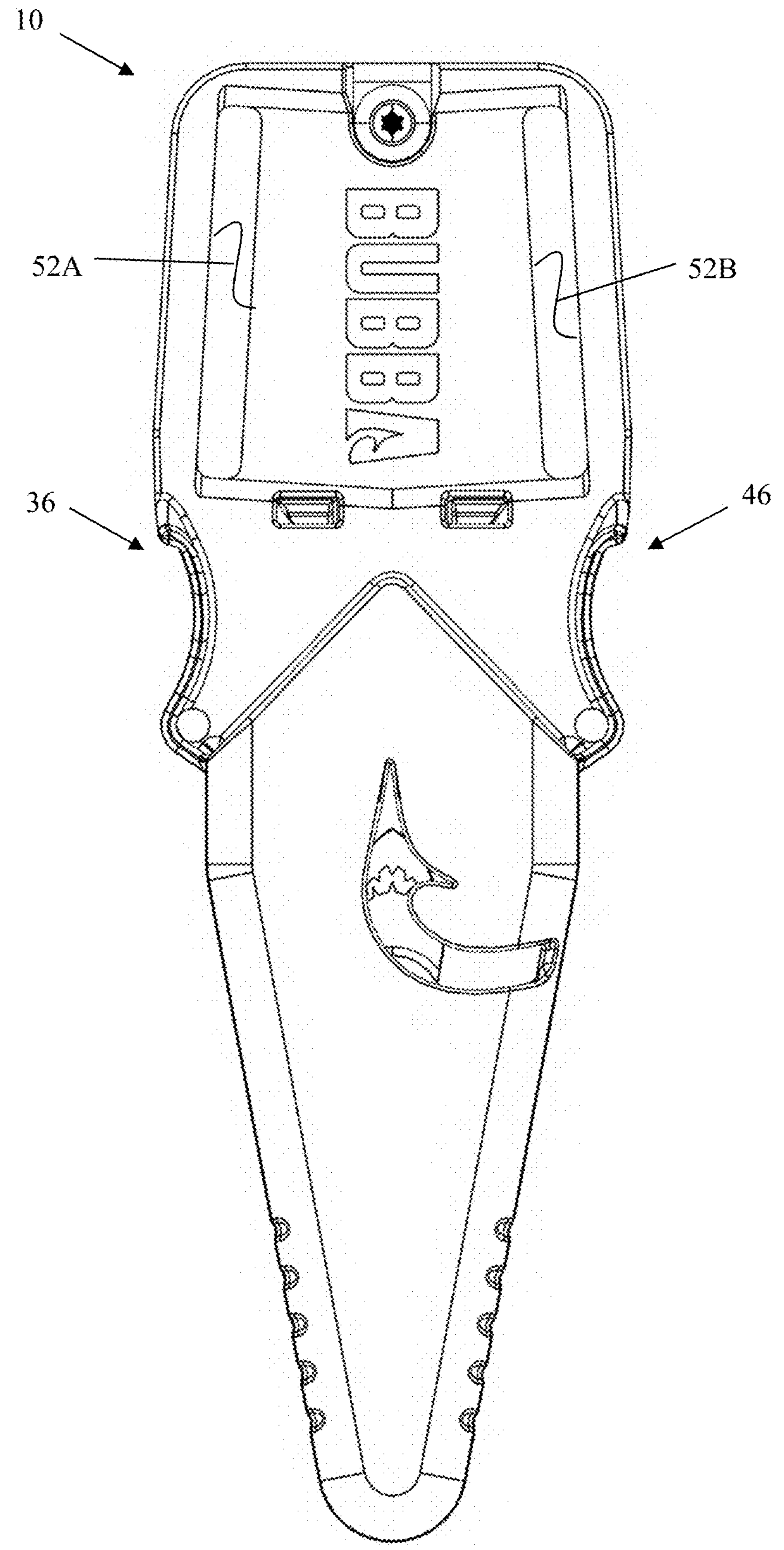
FIG. 8 is a front elevation of the sheath.
Figure 10:
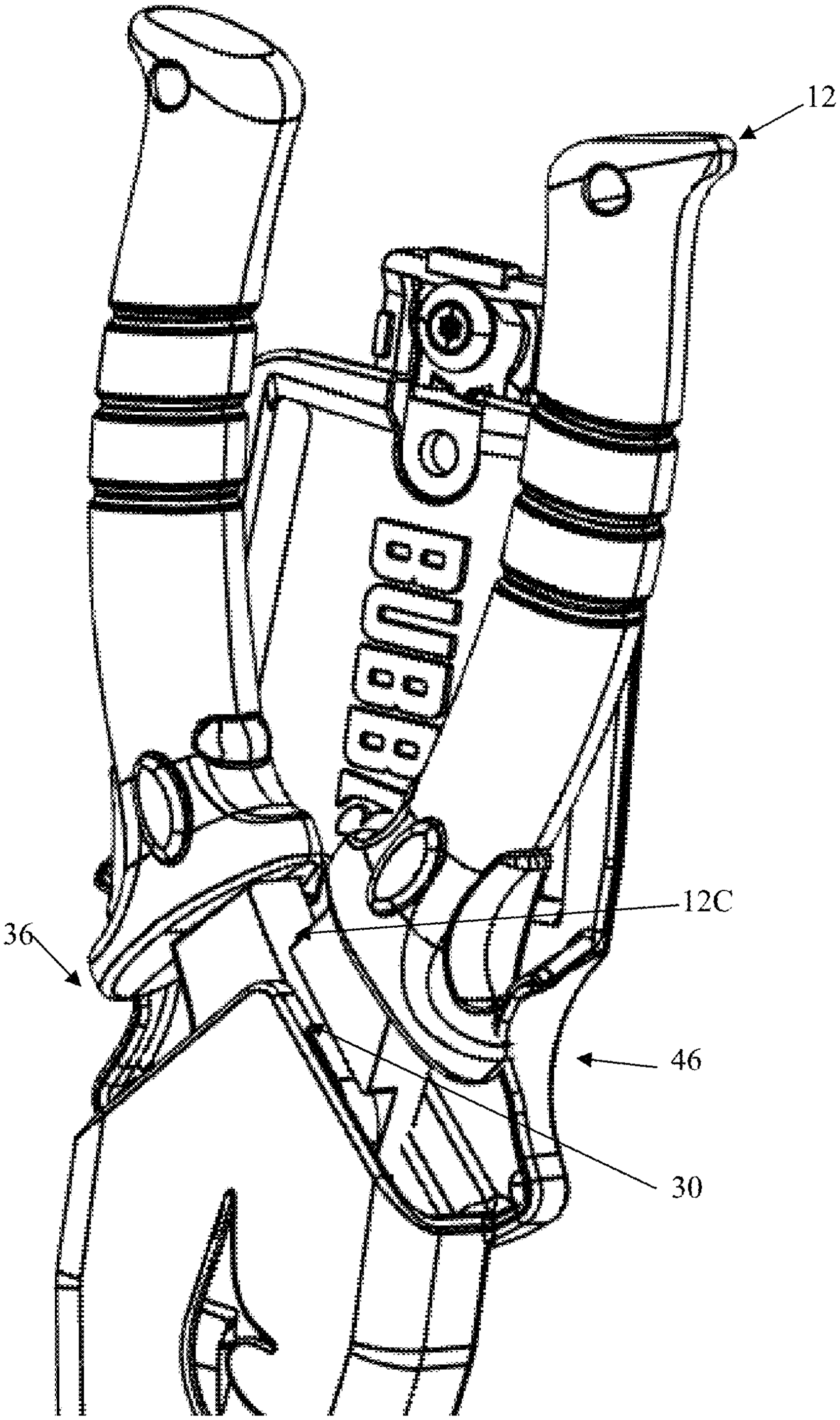
FIG. 10 is a fragmentary perspective of a second stage of the pliers entering the sheath.
Figure 11:
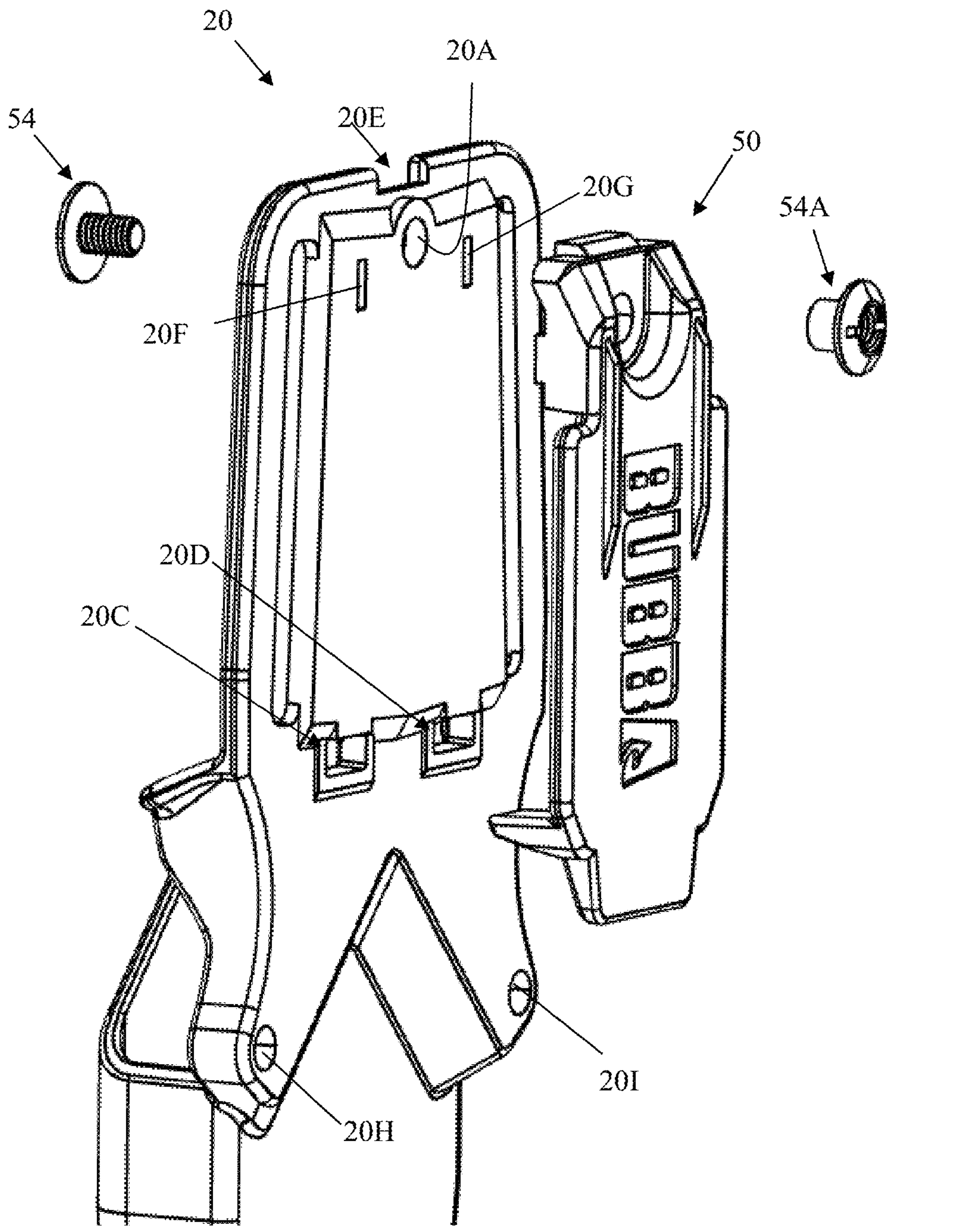
FIG. 11 is an enlarged fragmentary exploded rear perspective of mounting structure of the sheath.
Figure 12:
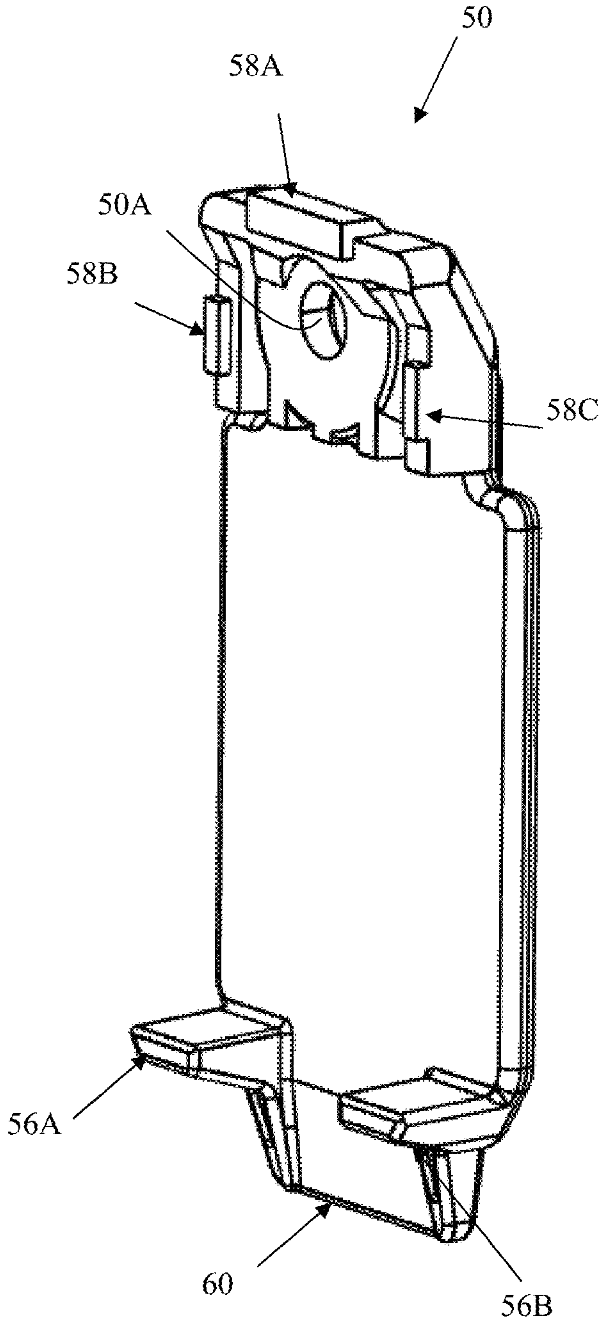
FIG. 12 is a front perspective of a clip of the sheath.
Figure 13:
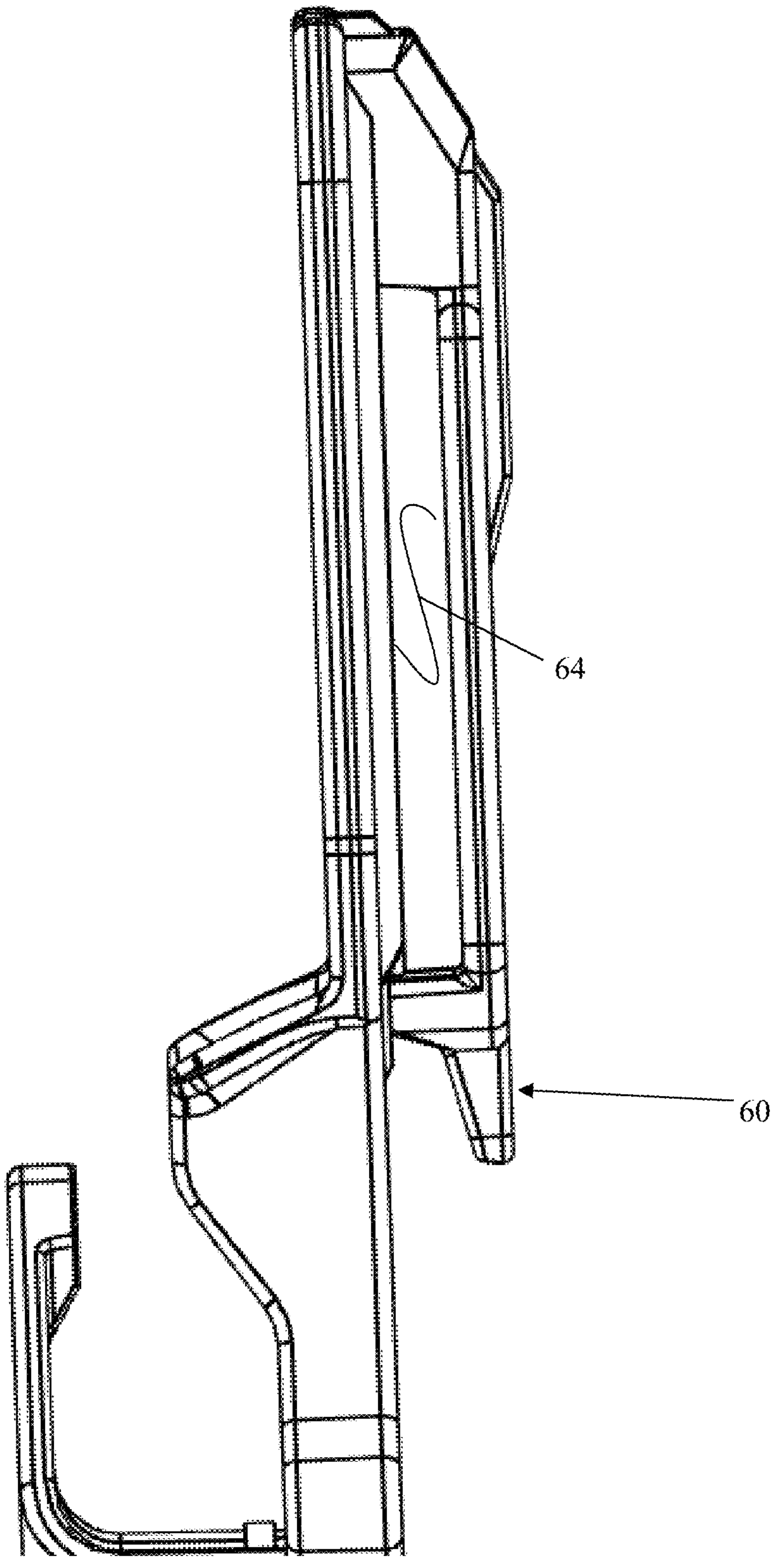
FIG. 13 is an enlarged fragmentary side view of the mounting structure of the sheath.

Referring to FIG. 10, in a second stage, the user continues to push the pliers 12 into the sheath 10, causing the heads of the respective handle portions 14A, 14B to begin to pass the first tapered surfaces 36D, 46D. As the heads begin to pass the first tapered surfaces, the recesses 18B of the handle portions begin to engage the camming surfaces 38A, 48A of the thumbs 38, 48 of the wing portions 36B, 46B of the respective second and third keepers 36, 46 to a Position 2. In Position 2, the joint 12C of the pliers 12 is still located above the first keeper 30. Referring to FIGS. 1 and 7, in a third stage, the user continues to push the pliers 12 into the sheath 10, causing the heads of the respective handle portions to begin to move into the gaps defined by the respective second ramp portions 36C, 46C of the second and third keepers 36, 46. Substantially simultaneously, the joint 12C of the pliers 12 begins (or already has begun) to engage the detent 30A of the first keeper 30. The sufficient force provided by the user pushing the pliers 12 into the sheath 10 causes the first keeper 30 to resiliently deflect outward. The surface of the joint 12C slides over the detent 30A until the pliers is inserted into the sheath 10 a sufficient amount, at which point the detent 30A passes the joint 12C causing the first keeper 30 to deflect back (i.e. snap) into its at rest position (or at least toward or near its at rest position) in a space above the joint 12C and between the handle portions.

Substantially simultaneously, as the joint 12C is sliding over the detent 30A, the heads of the respective handle portions 14A, 14B begin entering (or have already entered) into the gaps provided by the second ramp portions 36C, 46C. Once the first keeper 30 is back into its at rest position, now located above the joint 12C, and the thumbs 38, 38 of the second and third keepers 36, 46 are seated in the recesses 18B of the respective handle portions 14A, 14B, the pliers 12 is in the stowed position. The gripping portion of the handle portions provide a friction fit when engaged with the camming surfaces to further secure the pliers in place. The camming surface 30B of the detent is arranged above the top of the joint 12C such that a gap may be provided between the top of the joint 12C and the first retainer 30 when the pliers is in the stowed position. The holder 22 may be configured so that the camming surface 30B engages the top of the joint 12C when the pliers 12 is in the stowed positon without departing from the scope of this disclosure.

A similar but reverse sequence takes place when the user supplies a sufficient pulling force for removing (e.g. by pulling) the pliers from the sheath. It will be appreciated that the keepers are configured to permit camming of the keepers away from their respective at rest (retaining) positions to facilitate removal of the pliers from the receiving space by pulling force applied to the handles of the pliers. Accordingly, removal of the pliers from the sheath can be a one-handed operation.

The mount 20 comprises mount connection structure configured for mounting the sheath to a support structure such as, a belt, clothes of the user (e.g. a pocket), a suitable location of a boat (e.g. interior paneling on a fishing boat), etc.

The mount 20 includes an upper portion of the sheath body, and includes a clip 50. The upper portion of the body defines two slots 52A, 52B (broadly, "openings") through which a belt can be threaded to connect the sheath 10 to the belt. The mount 20 also comprises connection structure configured to removably connect the clip 50 to the mount 20. In the illustrated embodiment, the mount 20 defines a through hole 20A configured to receive a Chicago style screw 54 (broadly, "fastener") and nut 54A. The mount 20 defines openings 20C, 20D arranged to correspond with and configured to receive barbs 56A, 56B (broadly, "locks") of the clip 50. The mount 20 defines anti-rotation structure configured to prevent the clip from rotating when secured to the mount, as will become apparent. The anti-rotation structure includes a recess 20E defined by a top portion of the mount 20 and two slits 20F, 20G defined by the upper portion of the mount 20. The recess 20E is bounded by protrusions on each side of the recess 20E. In the illustrated embodiment, the slits 20F, 20G do not pass through the mount body. Additionally, the mount 20 defines two (broadly, "at least one") additional through holes 20H, 20I configured to receive a standard fastener (e.g. a screw).

The clip 50 comprises a clip body, an upper portion of the clip includes mounting structure, and a lower portion of the clip includes locking structure. The mounting structure includes a through hole 50A arranged to correspond with the through hole 20A of the mount 20 and configured to receive the Chicago style fastener 54. The upper portion includes tabs 58A, 58B, 58C arranged to engage with the anti-rotation structure. The locking structure includes two barbs 56A, 56B sized shaped and arranged to correspond with the openings 20C, 20D. A latch 60 is arranged below the barbs 56A, 56B to provide a surface for which the user can pull the clip backwards, as will become apparent.

When the clip 50 is fastened to the mount 20, the tab 58A is seating in the recess 20E and the tabs 50B, 50C are inserted into the corresponding slits 20F, 20G. Moreover, the barbs 56A, 56B are seated in the corresponding openings 20C, 20D. The configuration is such that the depths of the slits 20F, 20G and the lengths of the tabs 50B, 50C, together with the depths of the openings 20C, 20D and the length of the barbs 56A, 56B permit the clip to reside generally parallel fashion with the mount body when the clip is in an at rest position. The arrangement is such that a space 64 is provided by an interior of the clip body and an exterior of the mount body.

The user may thread a belt through at least one, preferably both, openings 52A, 52B defined by the mount body. Moreover, the user may thread a belt through the space 64 provided by the clip and the mount body. Alternatively, the user may pull the latch 60 backward away from the mount body to slide the clip 50 over a belt in which the clip will resiliently deflect back to its at rest position with the belt trapped in the space 64. Alternatively, the user may pull the latch 60 backward and slide the clip 50 into a pant or shirt pocket (broadly, "clothing material"). Once the user releases the latch 60, the clip 50 will tend to return to its at rest position however the barbs 56A, 56B will trap the clothing material into the openings 20C, 20D.

The user may mount the sheath to a more semi-permanent fixture (e.g. suitable paneling in a fishing boat, work bench, etc.), if desired. The user first removes the clip 50 from the mount 20 by removing the Chicago style fastener 54. Once the clip has been removed, the user can pass screws through the openings 20H, 20I, and/or the opening 20A where the Chicago style fastener previously occupied, to thread the screws to the chosen fixture.

It will be apparent that modifications and variations are possible without departing from the scope of the invention defined in the appended claims. The dimensions and proportions described herein are by way of example without limitation. Other dimensions and proportions can be used without departing from the scope of the present disclosure.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A pliers sheath for holding a pliers, the pliers having a head and at least two handles connected to the head at a joint, the pliers sheath comprising:

a mounting portion for mounting the sheath onto a support structure;

a pliers holder including a holder body made of flexible material and defining an upper opening and a receiving space for receiving the head of the pliers, the upper opening being arranged to permit passage of the head of the pliers into the receiving space through the upper opening, the upper opening having a peripheral edge including opposite side segments and a central segment extending between the side segments, the pliers holder including a keeper on the holder body and arranged to engage the pliers to retain the pliers in the sheath, the keeper being located on the same side of the holder body as the central peripheral edge segment in a position that is higher than locations of the opposite side segments of the peripheral edge, the flexible material of the holder body being configured to resiliently deform to move the keeper away from an at rest position in response to the insertion of the head of the pliers into the receiving space, and the flexible material of the holder body being configured to resiliently return the keeper toward the at rest position.

2. The pliers sheath of claim 1, wherein the keeper is configured to be located between the handles of the pliers when the pliers is in the pliers holder.

3. The pliers sheath of claim 1, wherein the keeper is arranged to be above the joint of the pliers when the pliers is in the pliers holder.

4. The pliers sheath of claim 1, wherein the keeper includes a detent that protrudes into the receiving space.

5. The pliers sheath of claim 2, wherein the keeper is a first keeper, the pliers holder further comprising a second keeper arranged to engage at least one of the at least two handles to retain the pliers in the sheath, the flexible material being configured to permit the second keeper to deflect away from an at rest positon in response to the insertion of the pliers into the receiving space, the flexible material being configured to resiliently return the second keeper toward the at rest positon when the pliers is in the pliers holder.

6. The pliers sheath of claim 5, wherein the second keeper protrudes into the receiving space above the first keeper.

7. The pliers sheath of claim 6, wherein the receiving space is configured to receive the pliers in a receiving direction, and the second keeper protrudes into the receiving space transversely with respect to the receiving direction.

8. The pliers sheath of claim 7, wherein the first and second keepers are configured to conjointly retain the pliers in the pliers holder.

9. The pliers sheath of claim 5, wherein the pliers holder further comprises a third keeper arranged to engage the other of the at least two handles to retain the pliers in the sheath, the flexible material being configured to permit the third keeper to deflect away from an at rest position in response to the insertion of the head of the pliers into the receiving space, the flexible material being configured to resiliently return the third keeper toward the at rest position.

10. The pliers sheath of claim 9, wherein the third keeper protrudes into the receiving space toward the second keeper.

11. The pliers sheath of claim 10, wherein the receiving space is configured to receive the pliers in a receiving direction, and the third keeper protrudes into the receiving space transversely with respect to the receiving direction.

12. The pliers sheath of claim 11, wherein the first, second, and third keepers are configured to conjointly retain the pliers is in the pliers holder.

13. The pliers sheath of claim 5, wherein the second keeper includes a thumb having a camming surface configured to engage one of the at least two handles.

14. The pliers sheath of claim 13, further comprising a third keeper including a thumb having a camming surface facing the camming surface of the second keeper, the thumb of third keeper being configured to engage the other of the at least two handles.

15. The pliers sheath of claim 14, wherein the first, second, and third keepers are configured to conjointly retain the pliers in the pliers holder.

16. The pliers sheath of claim 5, wherein the second keeper includes a ramp having a tapered surface facing away from the pliers receiving space, the ramp being configured to engage the at least one of the at least two handles to permit the second keeper to deflect away from the at rest positon.

17. The pliers sheath of claim 16, wherein the third keeper includes a ramp having a tapered surface facing away from the pliers receiving space, the ramp is configured to engage the segment of the other of the at least two handles to permit the third keeper to deflect away from the at rest positon.

18. The pliers sheath of claim 1, wherein said flexible material includes a polymeric material.

19. The pliers sheath of claim 1, in combination with the pliers received in the holder body.

* * * * *